(12) United States Patent
Huang et al.

(10) Patent No.: US 9,606,397 B2
(45) Date of Patent: Mar. 28, 2017

(54) DISPLAY DEVICE

(71) Applicant: AU Optronics Corporation, Hsin-Chu (TW)

(72) Inventors: Jian-Li Huang, Hsin-Chu (TW);
Wei-Chun Chung, Hsin-Chu (TW);
Su-Yi Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 156 days.

(21) Appl. No.: 14/337,323

(22) Filed: Jul. 22, 2014

(65) Prior Publication Data

US 2015/0029698 A1    Jan. 29, 2015

(30) Foreign Application Priority Data

Jul. 23, 2013  (TW) .............................. 102126347 A

(51) Int. Cl.
G09F 13/04 (2006.01)
G02F 1/1335 (2006.01)
G02F 1/1333 (2006.01)

(52) U.S. Cl.
CPC .. *G02F 1/133603* (2013.01); *G02F 1/133305* (2013.01); *G02F 1/133606* (2013.01)

(58) Field of Classification Search
CPC .................. G02F 1/133603; G02F 1/133605
USPC ....................................................... 362/97.1
See application file for complete search history.

(56) References Cited

U.S. PATENT DOCUMENTS 7,654,689 B2 *  2/2010  Chang ................... F21V 13/10
                                                     362/240
8,109,665 B2    2/2012  Lin et al.
8,272,772 B2 *  9/2012  Sato .................. G02F 1/133605
                                                   362/296.01

(Continued)

FOREIGN PATENT DOCUMENTS

CN    101375095 A    2/2009
CN    103383084 A    11/2013

(Continued)

OTHER PUBLICATIONS

Japan Office Action dated Jan. 20, 2015 issued in corresponding Japanese application.

(Continued)

*Primary Examiner* — Bryon T Gyllstrom
(74) *Attorney, Agent, or Firm* — McClure, Qualey & Rodack, LLP

(57) ABSTRACT

A display device includes a light source having a light emitting side, a partition plate disposed adjacent to the light emitting side and having light-emitting through holes distributed thereon, and a display panel having a light incident bottom surface and disposed at an opposite side of the partition plate with regard to the light source; the light incident bottom surface faces the partition plate. The light incident bottom surface has a first and a second area, the first and the second area project on the partition plate, respectively, to form a first and a second projection area. The first and the second area are away from the first and the second projection area by a first and a second average distance smaller than the first average distance. An average pitch of the light-emitting through holes in the first projection area is greater than that in the second projection area.

11 Claims, 10 Drawing Sheets

(56) References Cited

U.S. PATENT DOCUMENTS

| | | | | |
|---|---|---|---|---|
| 8,662,710 | B2* | 3/2014 | Sato | F21V 7/0025 362/297 |
| 8,911,106 | B2* | 12/2014 | Sato | F21S 8/061 362/241 |
| 2005/0201109 | A1* | 9/2005 | Shimura | F21V 5/007 362/382 |
| 2005/0280756 | A1* | 12/2005 | Kim | G02F 1/133603 349/114 |
| 2008/0094842 | A1* | 4/2008 | King | F21S 48/1159 362/297 |
| 2008/0266875 | A1* | 10/2008 | Chang | G02B 5/0278 362/309 |
| 2009/0003002 | A1* | 1/2009 | Sato | G02B 6/0043 362/341 |
| 2009/0059563 | A1* | 3/2009 | Takata | G02F 1/133606 362/97.1 |
| 2011/0018012 | A1* | 1/2011 | Tanaka | F21V 3/00 257/89 |
| 2012/0218752 | A1* | 8/2012 | Sumitani | F21V 11/14 362/235 |
| 2012/0250353 | A1* | 10/2012 | Sakamoto | G02B 6/0036 362/612 |
| 2013/0063925 | A1* | 3/2013 | Boonekamp | F21S 8/00 362/84 |
| 2013/0094216 | A1* | 4/2013 | Sato | F21V 7/22 362/297 |
| 2015/0029698 | A1* | 1/2015 | Huang | G02F 1/133603 362/97.1 |
| 2015/0219324 | A1* | 8/2015 | Kim | G02F 1/133305 349/58 |
| 2016/0109755 | A1* | 4/2016 | Jang | G02F 1/133305 362/97.1 |

FOREIGN PATENT DOCUMENTS

| | | |
|---|---|---|
| JP | 2005234096 A | 9/2005 |
| TW | 200745483 | 12/2007 |
| TW | M385715 | 8/2010 |
| TW | 201239239 | 10/2012 |

OTHER PUBLICATIONS

China Office Action dated Apr. 1, 2015.
Taiwan Office Action dated Jun. 10, 2015.
English translation of abstract of CN 103383084 A (published Nov. 6, 2013).

* cited by examiner

DISPLAY DEVICE

BACKGROUND OF THE INVENTION

1. Field of the Invention

The present invention generally relates to a display device. Particularly, the present invention relates to a display device having curved surface.

2. Description of the Prior Art

Flat panel display is extensively used in a variety of apparatuses having display function. For example, apparatuses such as display devices, computers, communication devices, and home appliances are equipped with flat panel display. Flat panel display may have display panel of various types such as liquid crystal display panel and plasma display panel. Furthermore, in addition to the general flat structure, display panels nowadays could be made lighter and even have curved shape or be flexible to facilitate versatile design of display or to develop different application of flat panel display.

As FIG. 1A shows, a display device 800 could include a display panel 810 and a light case 820. A light source 830 such as light-emitting diodes are disposed in the light case 820, wherein the light case 830 has a certain height to ensure a distance between the light source 830 and the display panel 810. The distance is associated with light mixing of the light emitted from the light source and therefore influences brightness or illumination uniformity of image. To ensure image quality, the distance is determined based on a ratio of the distance to a distance "d" between adjacent light sources that must be greater than or equal to 0.3 (i.e. the distance divided by "d"≥0.3). However, with regard to a display panel having curved shape, image quality is influenced since the distance between the light source and the display panel is not fixed and light-mixing distance is not fixed. As the conventional display device shown in FIG. 1, in which the distance "d" between any adjacent light sources is the same, when the distance "D2" divided by "d" equals 0.3 (i.e. D2/d=0.3), the distance "D1" divided by "d" will be less than 0.3 (i.e. D1/d<0.3). As such, even light around the location having the distance "D2" is well-mixed, light around the location having the distance "D1" will not be mixed sufficiently and the mura phenomena in image will occur. In order to ensure the distance "D1" divided by "d" equal to 0.3 (i.e. D1/d=0.3), the number of light sources has to be increased to compensate the shorter light-mixing distance and maintain image quality; however, the cost accordingly rises.

SUMMARY OF THE INVENTION

It is an object of the present invention to provide a display device having good image quality.

It is another object of the present invention to provide a display device having a better light-mixing result.

The display device of the present invention includes a light source, a partition plate, and a display panel. The light source has a light emitting side. The partition plate is disposed adjacent to the light emitting side of the light source and has a plurality of through holes. The display panel has a light incident bottom surface and is disposed at one side of the partition plate opposite to the light source, wherein the light incident bottom surface faces the partition plate. The partition plate has a first area and a second area each having at least two through holes therein, the first area and the second area are away from the light incident bottom surface by a first average distance and a second average distance, respectively. When the first average distance is greater than the second average distance, a first average pitch of the through holes in the first area is greater than a second average pitch of the through holes in the second area. Alternatively, a distance exists between a midpoint among any adjacent through holes and the light incident bottom surface, a ratio of the distance to a pitch of the adjacent through holes is substantially between 0.6 and 1.7.

The display device of the present invention includes a display panel and a backlight module. The backlight module is disposed under the display panel and includes a housing, a partition plate, and a light source. The partition plate is disposed in the housing and has a plurality of through holes. The partition plate divides an interior space of the housing into a first chamber and a second chamber; the first chamber is between the display panel and the partition plate; the light source is disposed in the second chamber. The first chamber includes a first section and a second section. When the first section has a first average height greater than a second average height of the second section, the through holes of the partition plate covered by the first section have a distribution density smaller than a distribution density of the through holes covered by the second section.

DETAILED DESCRIPTION OF THE PREFERRED EMBODIMENT

The illumination uniformity of image displayed by a display device depends on the illumination efficiency, light-emitting area, and/or light projection area of light source that are affected by the amount of light source and the arrangement of light source in a light case. For example, the brightness and quality of image are affected by the distance between adjacent light sources and the light-mixing distance between a light source and a display panel. In brief, a ratio of the distance between the light source and the display panel to the distance between the adjacent light sources is preferably within a proper range. On the other hand, a partition plate may be further disposed between the light source and the display panel. The partition plate may have light-emitting through holes for the light passing through. It may be regarded that the light-emitting through holes of the partition plate redistribute the light emitted from the light source, wherein the light emitted from the light-emitting through hole is mixed before arriving the display panel. Accordingly, a ratio of a distance between the light-emitting through hole and the display panel to the distance between adjacent light sources is preferably also within a proper range.

Figure 1:
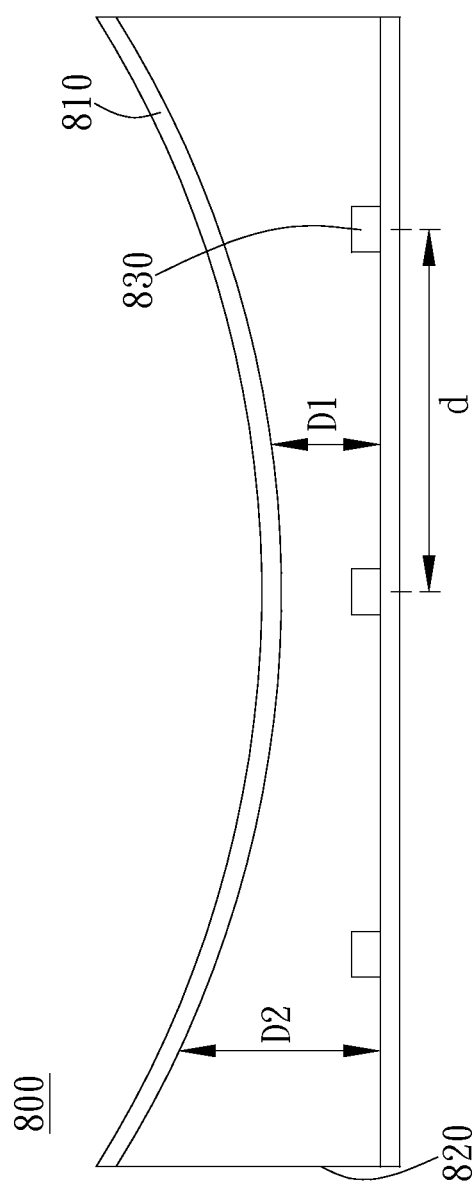
FIG. 1 is a schematic view of a conventional display device.
Figure 2A:
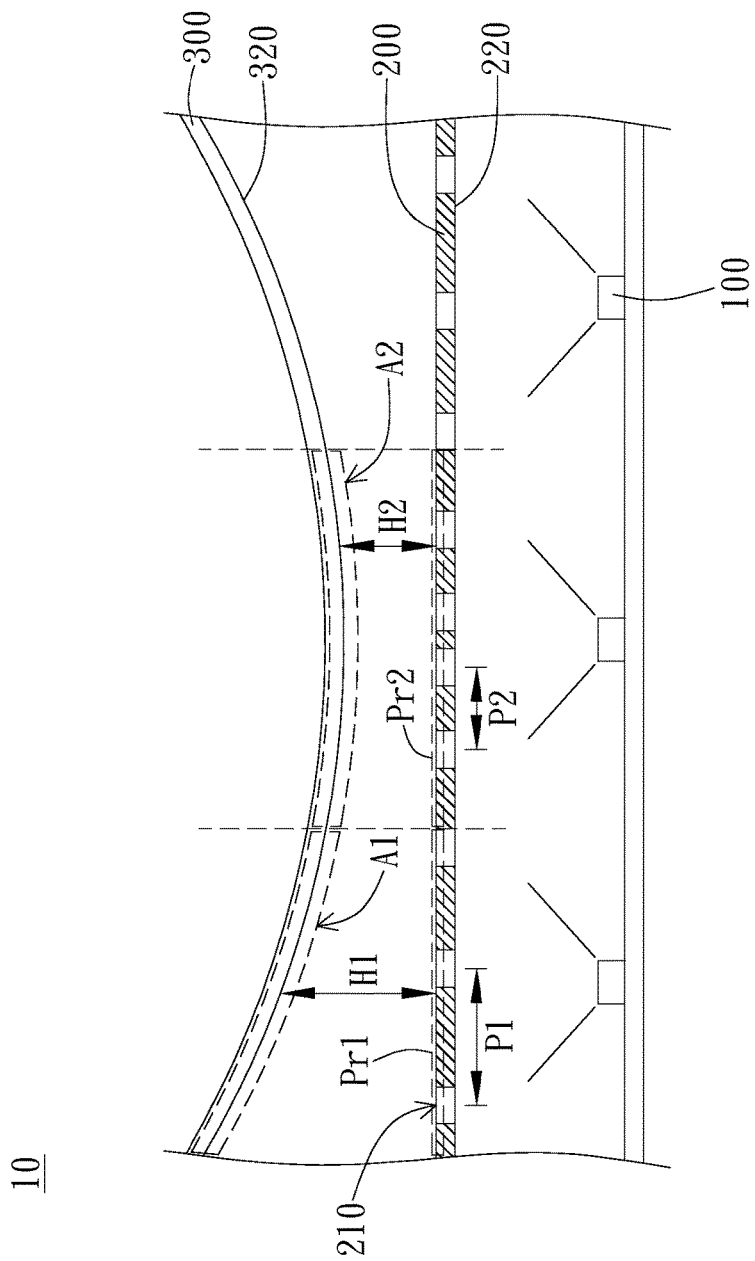
FIG. 2A is a schematic view of the embodiment of the display device of the present invention.
Figure 2B:
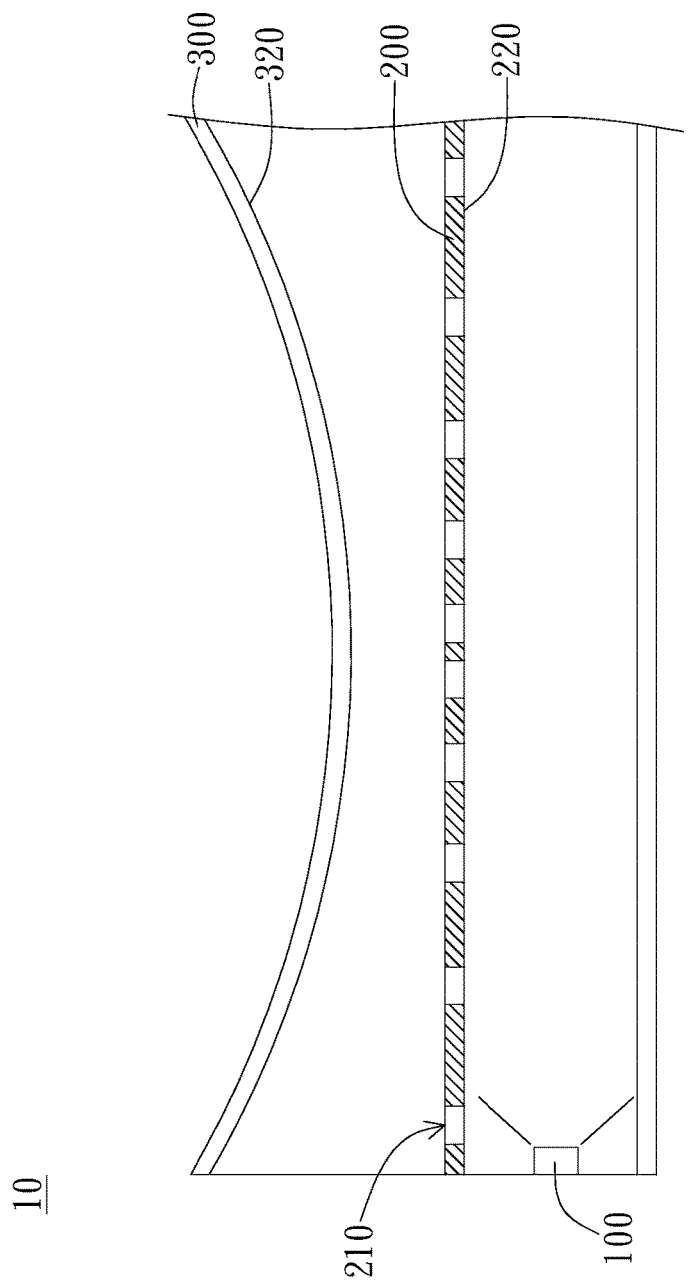
FIG. 2B is a schematic view of another embodiment of the display device of the present invention.

As FIG. 2A shows, an embodiment of the display device of the present invention includes a light source 100, a partition plate 200, and a display panel 300. The light source 100 has a light emitting side; the partition plate 200 is preferably disposed adjacent to the light emitting side of the light source 100. In other embodiments such as the backlight module of side-emitting type shown in FIG. 2B, however, the partition plate 200 may be disposed at a side near the light emitting side. A plurality of light-emitting through holes 210 are formed in the partition plate 200 by means of such as laser drilling and mechanical drilling. The light-emitting through holes 210 allows light to pass therethrough. The light-emitting through holes 210 may have a same diameter or different diameters. In addition, the light-emitting through holes 210 preferably have unequal pitches. Furthermore, the partition plate 200 may have a reflective surface 220 facing the light source 100. In a preferred embodiment, a reflective index of the reflective surface 220 is greater than 98%. As a result, in addition to passing through the light-emitting through holes 210, the light emitted from the light source 100 may be reflected by the reflective surface 220 and is reusable. The display panel 300 is disposed at one side of the partition plate 200 opposite to the light source 100 and has a light incident bottom surface 320 facing the partition plate 200. In addition, the light source 100 may be, for example, a plurality of light sources such as lamps or light-emitting diodes disposed in the backlight module.

Further speaking, the light incident bottom surface 320 of the display panel 300 has a first area A1 and a second area A2. The first area A1 and the second area A2 respectively project on the partition plate 200 to form a first projection area Pr1 and a second projection area Pr2, wherein the first area A1 and the second area A2 are respectively away from the first projection area Pr1 and the second projection area Pr2 by a distance. When at least one of the display panel 300 and the partition plate 200 is not a horizontal plane or, for example, has a curved shape, a distance between the first area A1 and the first projection area Pr1 is not equal to a distance between the second area A2 and the second projection area Pr2. In the embodiment shown in FIG. 2A, the display panel 300 has a curved shape and is concaved toward the light source 100 while the partition plate 200 is a flat plane. In the embodiment, the first area A1 and the second area A2 are separately a curved surface without singular point, wherein the second area A2, for example, is an area closer to the center of the curved surface.

Furthermore, the distance mentioned above is preferably an average of projection distance that exists between each point in each area and its corresponding projection point in the projection area of the partition plate 200; alternatively, the distance may be an average distance (in different areas such as the first area A1 or the second area A2) between the display panel 300 and the partition plate 200. The projection distance is defined as a vertical distance along a normal line of the partition plate 200 from the partition plate 200 to the light incident bottom surface 320. For example, in the embodiment shown in FIG. 2A, a first average distance H1 exists between the first area A1 and the first projection area Pr1 and a second average distance H2 exists between the second area A2 and the second projection area Pr2.

On the other hand, in the preferred embodiment of the present invention, the light-emitting through holes 210 have different pitches therebetween, such as P1 and P2, wherein the pitch is defined as a distance between the centers of any two adjacent light-emitting through holes 210. When the first average distance H1 and the second average distance H2 are not equal and the first average distance H1 is greater than the second average distance H2, the average pitch P1 of the light-emitting through holes 210 in the first projection area Pr1 is preferably greater than the average pitch P2 of the light-emitting through holes 210 in the second projection area Pr2, wherein both a ratio of H1 to P1 and a ratio of H2 to P2 are substantially in a range between 0.6 and 1.7. That is, the ratio of H1/P1 and the ratio of H2/P2 are preferably not greater than 1.7 and not less than 0.6.

Ways of defining and/or demarcating the first area A1 and the second area A2 are not limited to what have shown in the figures; any two areas on the light incident bottom surface 320 could be defined as the first area A1 and the second area A2.

Figure 4A:
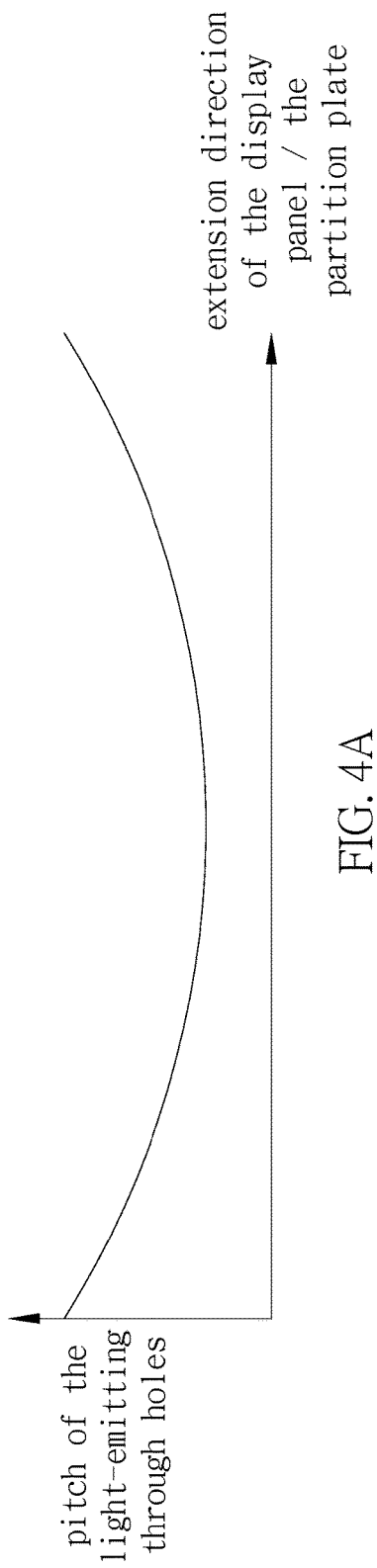
FIGS. 4A-4B are graphs showing the relation between the pitch of the light-emitting through holes and the extension direction of the display panel or the partition plate of the display device of the present invention.

The display panel 300 shown in FIG. 2A has a concaved curved shape, i.e. the light incident bottom surface 320 of the display panel 300 generally gradually goes close to the partition plate 200 and then gradually goes away therefrom along a direction from one side of the display panel 300 to another side thereof, wherein since the first average distance H1 is greater than the second average distance H2, the first area A1 is farther away from the center of the light incident bottom surface 320 than the second area A2 is. On the other hand, as shown in FIG. 4A, pitch (the average pitch) of the light-emitting through holes in principle becomes smaller and then grows larger along with a change of the distance between the light incident bottom surface 320 and the partition plate 200, which is decreased and then increased.

Figure 3A:
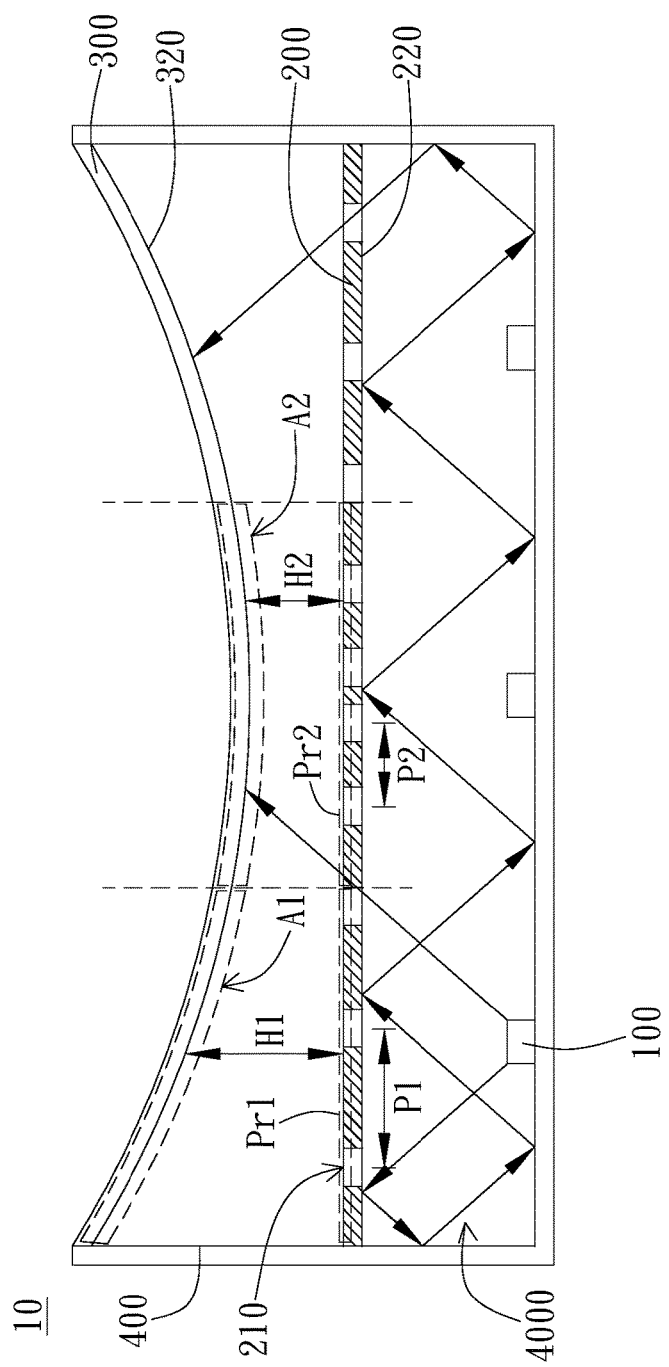
FIG. 3A is another schematic view of the embodiment of the display device of the present invention.
Figure 3B:
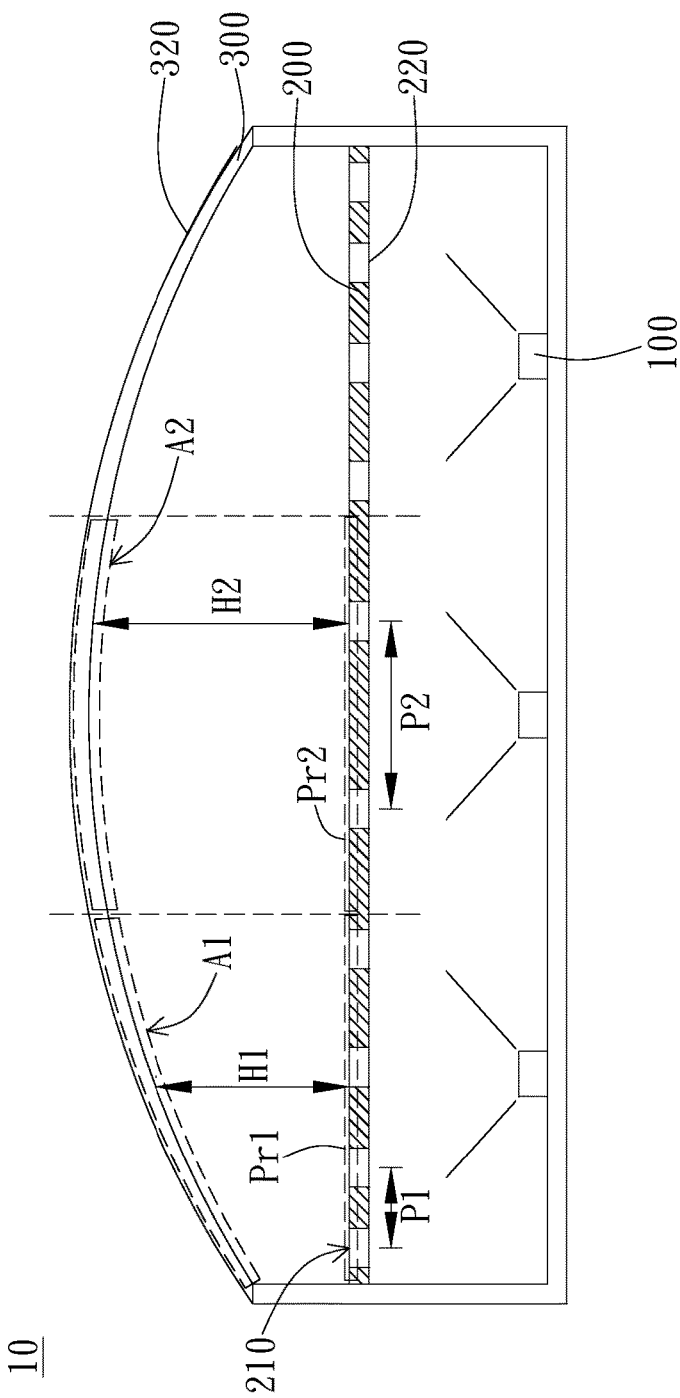
FIG. 3B is a schematic view of another embodiment of the display device of the present invention.
Figure 4B:
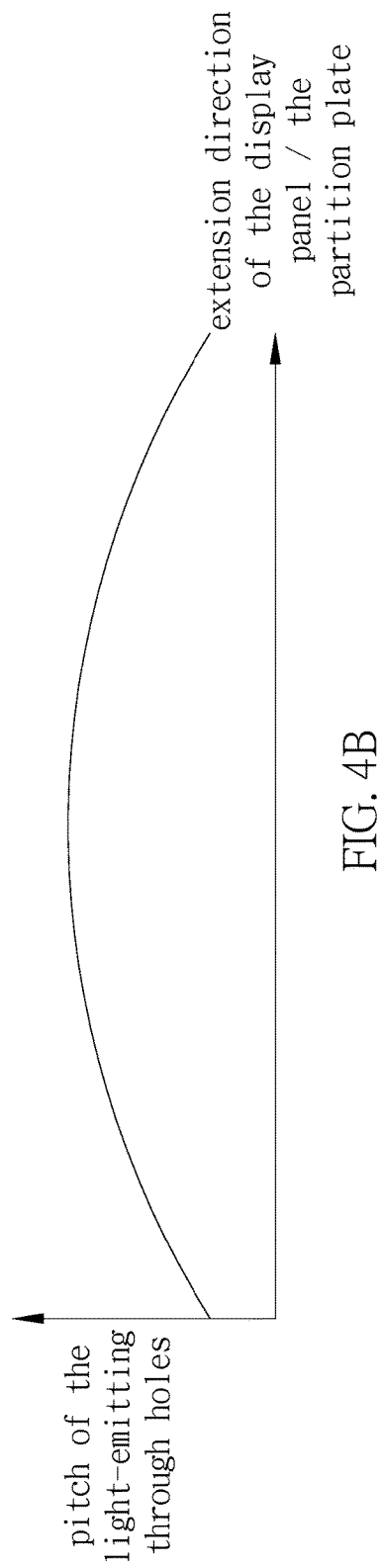

In other embodiments, the display panel 300 may have a convex curved shape, i.e. the light incident bottom surface 320 of the display panel 300 generally gradually goes away from the partition plate 200 and then gradually goes closer thereto along the direction from one side of the display panel 300 to another side thereof, as shown in FIG. 3B. Since the first average distance H1 is less than the second average distance H2, the first area A1 is therefore farther away from the center of the light incident bottom surface 320 approximately in the extending direction of the display panel 300 than the second area A2 is. In this embodiment, as shown in FIG. 4B, pitch (the average pitch) of the light-emitting through holes in principle grows larger and then becomes smaller along with a change of the distance between the light incident bottom surface 320 and the partition plate 200, which is increased and then decreased.

The display device of the present invention further includes a housing 400, as shown in FIGS. 3A-3B. The above mentioned light source 100 and partition plate 200 may be accommodated in the housing 400. The housing 400 could be a light case. The housing 400, for example, may be composed of back plate of a backlight module, wherein the light source 100 may be disposed inside the back plate and on the bottom of the back plate. The housing 400 and the reflective surface 220 of the partition plate 200 could further form a reflective chamber 4000, wherein material of the partition plate 200 could be chosen from metal or plastic; material of the housing 400 could be chosen from reflective material. In one embodiment, the reflective index of the housing is greater than 98%. In another embodiment, optical film having reflection function such as a reflective sheet is disposed in the housing 400. In addition to passing through the light-emitting through holes 210, the light may be reflected by and in the reflective chamber 4000 and is reusable to increase the light-usage efficiency.

Figure 5A:
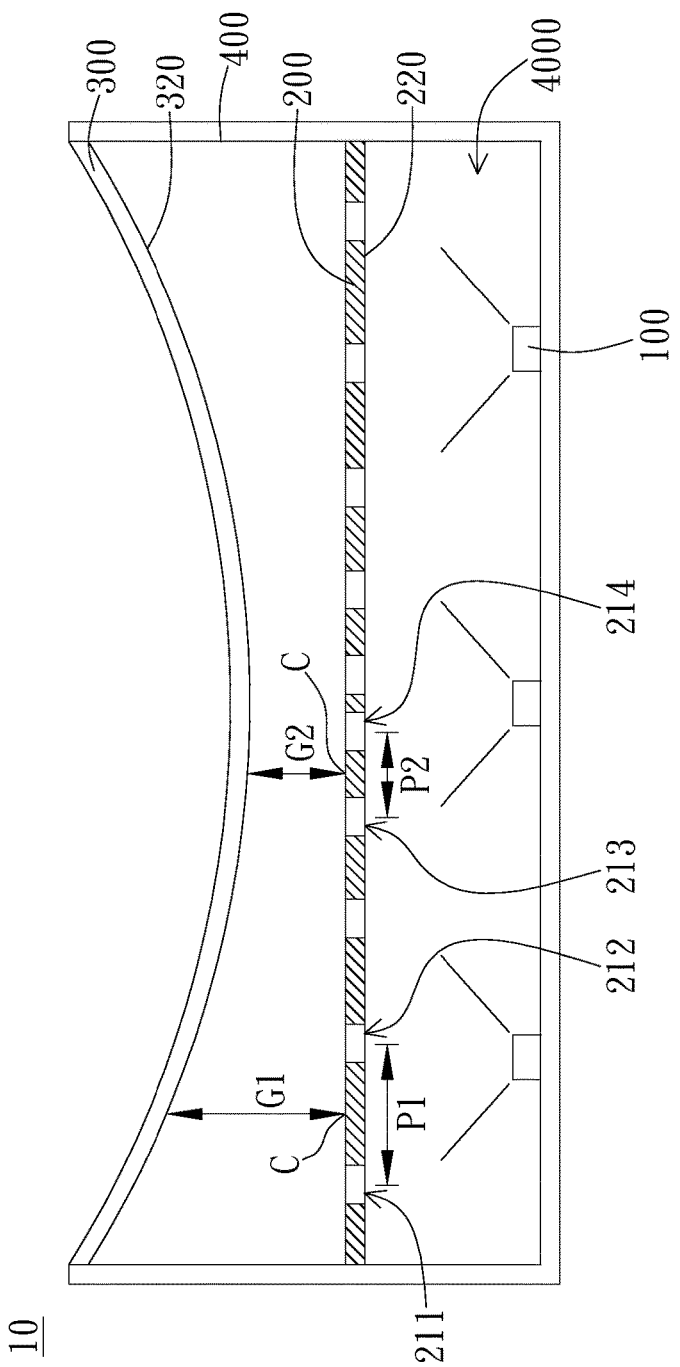
FIG. 5A is a schematic view of another embodiment of the display device of the present invention.
Figure 5B:
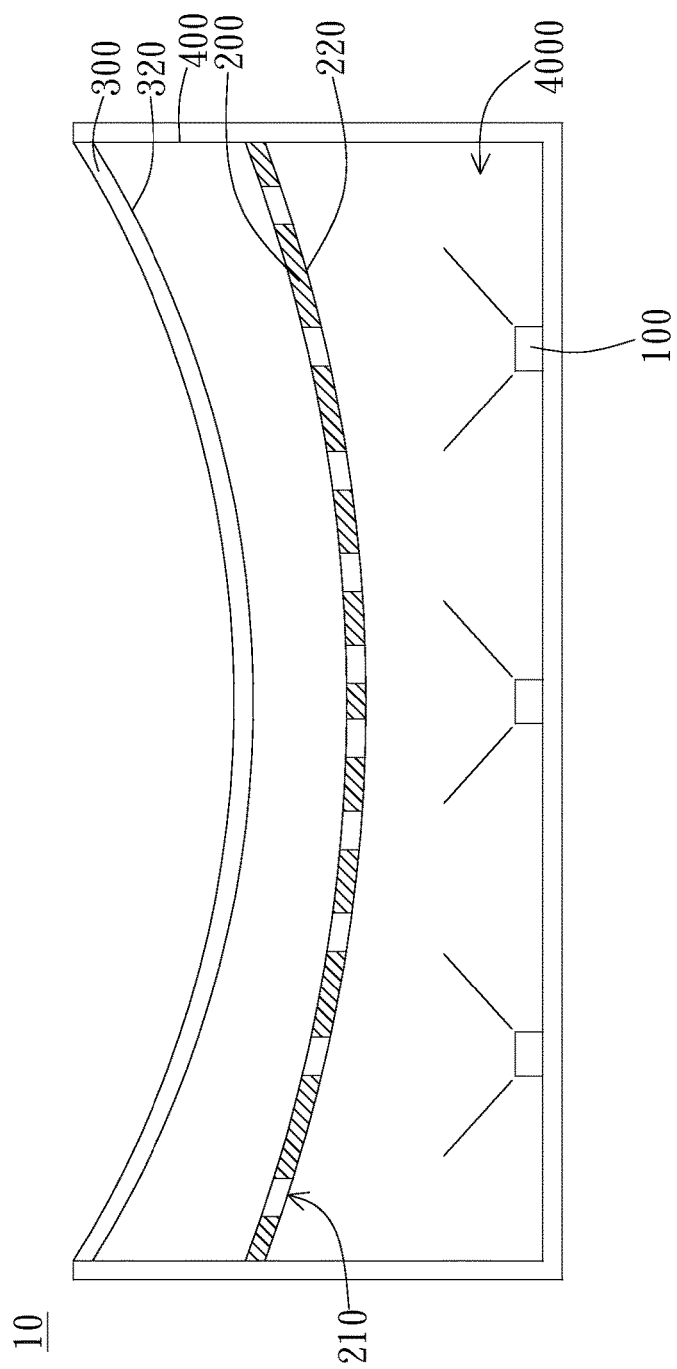
FIG. 5B is a schematic view of another embodiment of the display device of the present invention.

In another embodiment of the present invention, as shown in FIGS. 5A-5B, the display device 10 includes the light source 100, the partition plate 200, and the display panel 300 as mentioned above. The partition plate 200 is disposed adjacent to the light emitting side of the light source 100 and has a plurality of light-emitting through holes 210. The light-emitting through holes 210 may have a same diameter or different diameters. In addition, the light-emitting through holes 210 preferably have unequal pitches. Furthermore, the partition plate 200 may have a reflective surface 220 facing the light source 100. In a preferred embodiment, the reflective index of the reflective surface 220 is greater than 98% so that light-usage efficiency may be improved. The display panel 300 is disposed at one side of the partition plate 200 opposite to the light source 100 and has a light incident bottom surface 320 facing the partition plate 200, wherein a distance exists between the light incident bottom surface 320 of the display panel 300 and the partition plate 200. The distance between the light incident bottom surface 320 and the partition plate 200 may be not of a fixed value, for example, under a condition that the display panel 300 has curved shape, as shown in FIG. 5A. On the other hand, the distance between the partition plate 200 and the light source 100 may be not of a fixed value, for example, under a condition that both the display panel 300 and the partition plate 200 have a curved shape, as shown in FIG. 5B.

Further speaking, with regard to the distance between the light incident bottom surface 320 and the partition plate 200, which has its value measured around two adjacent light-emitting through holes 210, a ratio of the distance to the pitch of the adjacent light-emitting through holes 210 is substantially between 0.6 and 1.7. The pitch may refer to the distance between the centers of two adjacent light-emitting through holes, and the distance may refer to a distance from the midpoint of two adjacent light-emitting through holes 210 to the light incident bottom surface 320.

As shown in FIG. 5A, a first through hole 211 and a second through hole 212, for example, are two adjacent light-emitting through holes; a third through hole 213 and a fourth through hole 214 are another two adjacent light-emitting through holes, wherein a pitch P1 of the first through hole 211 and the second through hole 212 is substantially a distance from the center of the first through hole 211 to the center of the second through hole 212; a pitch P2 of the third through hole 213 and the fourth through hole 214 is substantially a distance from the center of the third through hole 213 to the center of the fourth through hole 214. The pitch P1 and the pitch P2 are not equal. On the other hand, a distance G1 from a position on the partition plate 200 around the adjacent first through hole 211 and second through hole 212 to the light incident bottom surface 320 is substantially a vertical distance from the midpoint "C" of the first through hole 211 and the second through hole 212 to the light incident bottom surface 320; a distance G2 from a position on the partition plate 200 around the adjacent third through hole 213 and fourth through hole 214 to the light incident bottom surface 320 is substantially a vertical distance from the midpoint "C" of the third through hole 213 and the fourth through hole 214 to the light incident bottom surface 320. The distance G1 and the distance G2 could be not equal.

When the above mentioned distance G1 and distance G2 are not equal, in the case that the distance G1 is greater than the distance G2, the pitch P1 is preferably greater than the pitch P2. In other words, the distance increases along with the pitch, and vice versa. The ratio of the distance to the pitch of the adjacent light-emitting through holes, is substantially between 0.6 and 1.7.

Figure 6:
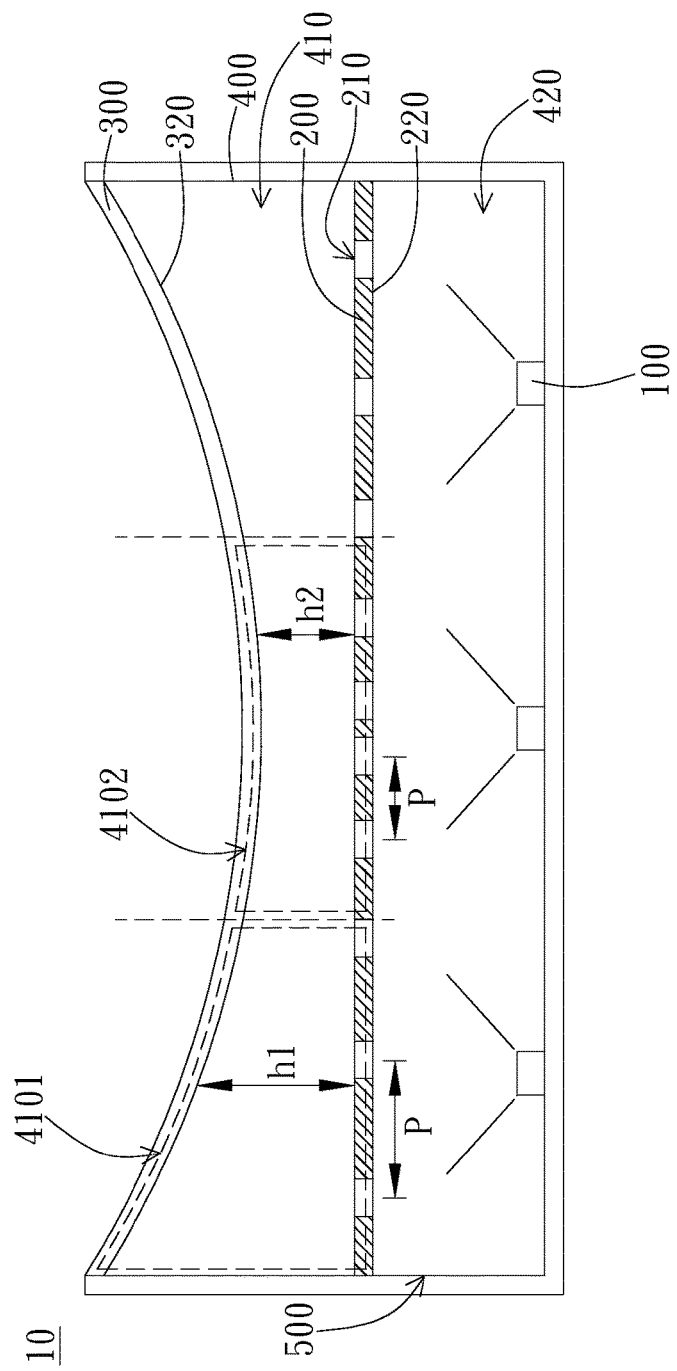
FIG. 6 is a schematic view of another embodiment of the display device of the present invention.

As FIG. 6 shows, in another embodiment of the present invention, the display device 10 includes the display panel 300 and a backlight module 500. The display panel 300 has the light incident bottom surface 320 and is preferably disposed above/on the backlight module having its light incident bottom surface facing the backlight module 500. The backlight module 500 includes the housing 400, wherein the partition plate 200 and the light source 100 are disposed in the housing 400. The partition plate 200 has a plurality of light-emitting through holes 210 and divides an interior space of the housing 400 into a first chamber 410 and a second chamber 420. For example, the partition plate 200 is placed in the housing 400 to form the first chamber 410 with the light incident bottom surface 320 of the display panel 300 and the second chamber 420 with an inner bottom of the housing 400. The light source 100 is preferably disposed in the second chamber 420. The light emitted from the light source 100 can pass the light-emitting through holes 210 and leave the second chamber 420 from the light-emitting through holes 210 to enter the first chamber 410. That is, the second chamber 420 and the light-emitting through holes 210 can be provided for light re-distribution; the first chamber 410 can be provided for light mixing, wherein the second chamber 420 can further be a reflective chamber.

In other words, the first chamber 410 has the partition plate 200 as a bottom and the light incident surface 320 as a top side. On the other hand, the first chamber 410 may further include different sections, which is substantially arranged side by side along the partition plate 200 and are all the suppositional sections having the partition plate 200 as the bottom and the light incident bottom surface 320 as the top side. The size and number of the sections can be variable and not limited to what have shown in the figures. In addition, the size of a bottom area of each section is equal to a projection area on the partition plate 200, and vice versa.

For example, the first chamber 410 includes a first section 4101 and a second section 4102. These sections can have different heights; for example, these sections have different heights when at least one of the display panel 300 and the partition plate 200 has a curved shape. The height is an average height in each section such as the first section 4101 having a first average height h1, the second section 4102 having a second height h2.

On the other hand, the light-emitting through holes 210 of the partition plate 200 in the present embodiment, for example, may have identical diameter or different diameters. In addition, these light-emitting through holes 210 may be distributed evenly on the partition plate 200. Alternatively, the partition plate 200 may have the light-emitting through holes 210 distributed thereon in different density. Preferably, the distribution density of the light-emitting through holes 210 is negatively correlated to the height/average height of the section. For example, when the first average height h1 of the first section 4101 is greater than the second average height h2 of the second section 4102, a distribution density of the light-emitting through holes 210 in an area on the partition plate 200 covered by the first section 4101 is lower in comparison to a distribution density of the light-emitting through holes 210 covered by the second section 4102. Meanwhile, the density preferably refers to the density in number. The distribution density of the light-emitting through holes 210 may be adjusted by such as changing the number of the light-emitting through holes 210. Alternatively, the distribution density of a fixed number of the light-emitting through holes 210 may be further adjusted by such as making a light-emitting through hole to get closer to some light-emitting through holes while leaving away from some another light-emitting through holes; in other words, the fixed number of the light-emitting through holes 210 are either separated from each other or pulled together.

In sum, the above mentioned height or average height of the section is related to the distribution density of the light-emitting through holes; the distribution density of the light-emitting through holes is related to the pitch of the holes; preferably, a ratio of the height/average height to the pitch/average pitch of the light-emitting through holes covered by the section is substantially between 0.6 and 1.7.

Figure 7:
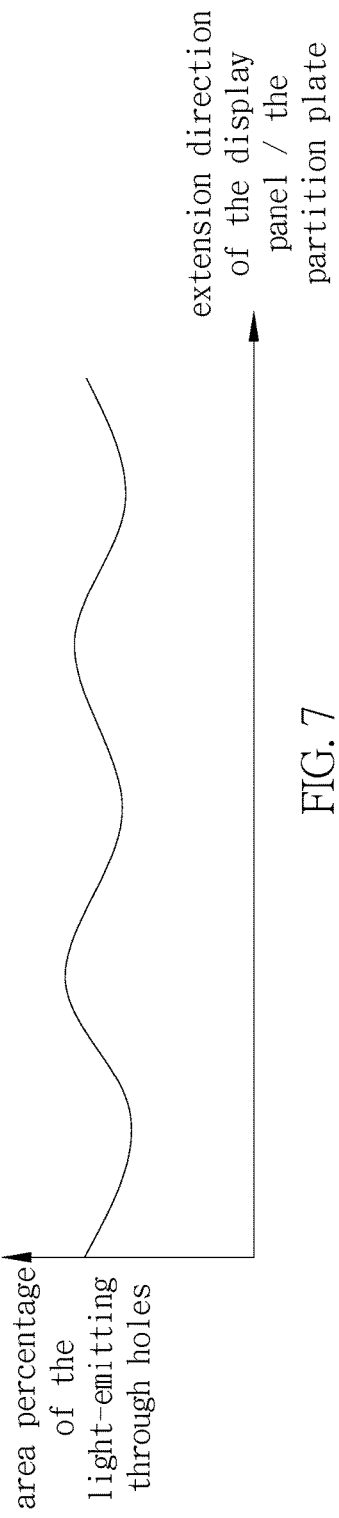
FIG. 7 is a graph showing the relation between the area percentage of the light-emitting through holes and the light source distribution of the display device of the present invention.

In other embodiments of the present invention, the diameter of the light emitting through holes can be adjusted in accordance with the location of the holes with respect to the light source 100. Alternatively, the light-emitting through holes 210 resident in different areas of the partition plate 200 occupy different opening areas in the different areas, respectively, wherein each area may have its measure of area based on a location thereof with respect to the light source 100. The opening areas is contributed by such as the light-emitting through holes having various diameters. In the present invention, an area percentage could be regarded as a measure of each opening area in each partition plate 200 unit. Preferably, the measure of the opening area of the light-emitting through holes located above the light source 100 is less. Comparatively, the measure of the opening area of the light-emitting through holes located away from the light source 100 is greater. In other words, with regard to each partition plate 200 unit, the area percentage of the light-emitting through holes located above the light source 100 is less while the area percentage of the light-emitting through holes located away from the light source 100 is greater. In an embodiment that the light source 100 includes a plurality of light sources having their light emitting side facing the partition plate 200, the measure of area (or area percentage), as shown in FIG. 7, may vary in accordance with the distance from the light source to the partition plate 200, which varies by turns. Accordingly, illumination uniformity among every area of the display panel 300 will be improved. In other embodiments, it is possible to make the diameter of the light-emitting through holes 210 above the light source 100 to be less than the diameter of the light-emitting through holes 210 away from the light source to balance the light emitting from the partition plate 200 and/or the light-emitting through holes 210. In other words, light-emitting through holes 210 on a portion of the partition plate 200 having less diameter constitutes less measure of area (area percentage) in the portion of the partition plate 200; light-emitting through holes 210 on a portion of the partition plate 200 having greater diameter constitutes greater measure of area (area percentage) in the portion of the partition plate 200.

Figure 8:
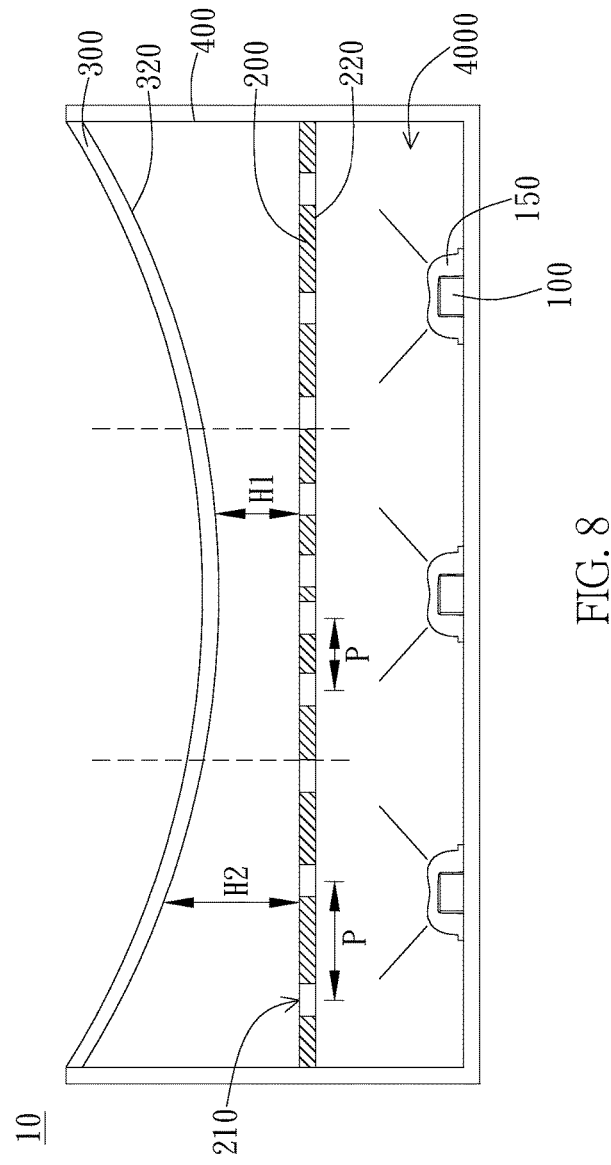
FIG. 8 is a schematic view of another embodiment of the display device of the present invention.

In other embodiments of the present invention, the light source 100 may include a plurality of light sources composed of light-emitting diodes and lens 150, as shown in FIG. 8. Such a light source may be used for achieving larger illumination area, and/or greater projection area. In addition, such a light source may be used and cooperated with the distance between the partition plate 200 and the light source 100 and/or the size or distribution density of the light-emitting through holes 210.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A display device, including:
   a light source having a light emitting side;
   a partition plate disposed adjacent to the light emitting side of the light source, the partition plate having a plurality of through holes; and
   a display panel having a light incident bottom surface, the display panel disposed at one side of the partition plate opposite to the light source, wherein the light incident bottom surface faces the partition plate;
   wherein the partition plate has a first area and a second area each having at least two through holes therein, the first area and the second area are away from the light incident bottom surface by a first average distance and a second average distance, respectively; the first average distance is greater than the second average distance; a first average pitch of the through holes in the first area is greater than a second average pitch of the through holes in the second area.

2. The display device of claim 1, wherein a ratio of the first average distance to the first average pitch in the first area and a ratio of the second average distance to the second average pitch in the second area are both substantially between 0.6 and 1.7.

3. The display device of claim 1, wherein the partition plate has a reflective surface facing the light source.

4. The display device of claim 3, further comprising a housing, wherein the light source and the partition plate are disposed in the housing, and the housing and the reflective surface of the partition plate form a reflective chamber.

5. The display device of claim 1, wherein an area percentage of the through holes of the partition plate in a position around above the light source is smaller than an area percentage of the through holes in a position away from the light source.

6. The display device of claim 1, wherein the display panel is a curved shape.

7. A display device, including:
   a display panel; and
   a backlight module disposed under the display panel, comprising:
   a housing;
   a partition plate disposed in the housing, the partition plate having a plurality of through holes, wherein the partition plate divides an interior space of the housing into a first chamber and a second chamber, wherein the partition plate, a light incident bottom surface of the display panel and the housing form the first chamber; and
   a light source disposed in the second chamber;
   wherein the first chamber includes a first section and a second section; the first section has a first average height greater than a second average height of the second section; the through holes of the partition plate covered by the first section have a distribution density smaller than a distribution density of the through holes covered by the second section.

8. The display device of claim 7, wherein the partition plate has a reflective surface facing the light source; the second chamber is a reflective chamber.

9. The display device of claim 7, wherein a ratio of the first average height to an average pitch of the through holes of the partition plate covered by the first section is between 0.6 and 1.7.

10. The display device of claim 7, wherein a ratio of the second average height to an average pitch of the through holes of the partition plate covered by the second section is between 0.6 and 1.7.

11. The display panel of claim 7, wherein the display panel has a curved shape.

* * * * *